United States Patent [19]

Nakano

[11] Patent Number: 5,128,889
[45] Date of Patent: Jul. 7, 1992

[54] FLOATING-POINT ARITHMETIC APPARATUS WITH COMPENSATION FOR MANTISSA TRUNCATION

[75] Inventor: Hiraku Nakano, Kyoto, Japan

[73] Assignee: Matsushita Electric Industrial Co., Ltd., Osaka, Japan

[21] Appl. No.: 659,198

[22] Filed: Feb. 22, 1991

[30] Foreign Application Priority Data

Feb. 22, 1990 [JP] Japan .................................. 2-42272
Feb. 22, 1990 [JP] Japan .................................. 2-42273

[51] Int. Cl.$^5$ .............................................. G06F 7/38
[52] U.S. Cl. .................................. 364/748; 364/745
[58] Field of Search .................. 364/748, 745, 715.1

[56] References Cited

U.S. PATENT DOCUMENTS 4,928,259 5/1990 Galbi et al. ...................... 364/745

FOREIGN PATENT DOCUMENTS 63-298435 12/1988 Japan .

Primary Examiner—Tan V. Mai
Attorney, Agent, or Firm—Lowe, Price, LeBlanc & Becker

[57] ABSTRACT

A floating-point multiplication apparatus is described which includes circuits for predicting the logical sum of a set of low-significance bits which are truncated from an intermediate product resulting from multiplying together two mantissas, without the necessity for examining the truncated bits, to thereby determine the state of a bit which is attached to replace the truncated bits in the intermediate product and upon whose state a subsequent rounding-off operation depends. A floating-point addition and subtraction apparatus is also described in which numbers of trailing zeros of the mantissas of two operands are derived concurrently with determining which of the operands has a smaller value of exponent, with the result of that determination being used to select the appropriate number of trailing zeros, for use in setting the state of a bit on which a subsequent rounding-off operation depends.

1 Claim, 10 Drawing Sheets

FIG. 4
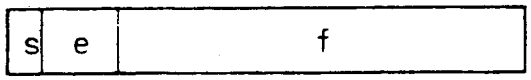
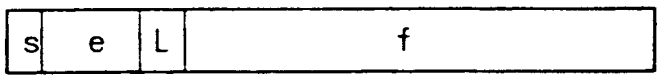
FIG. 5
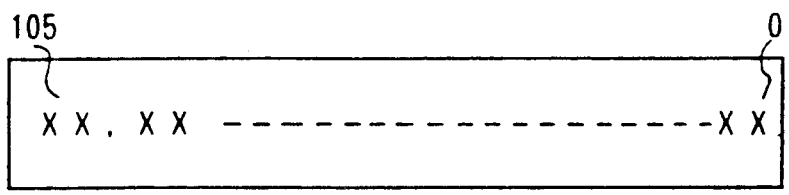
OVERFLOW BIT : BIT 105 ($2^1$)
LSB : BIT 52 ($2^{-52}$)
GUARD BIT : BIT 51 ($2^{-53}$)
ROUND BIT : BIT 50 ($2^{-54}$)
STICKY BIT : LOGICAL SUM OF ALL OF BITS 49 TO 0
($2^{-55}$ TO $2^{-105}$)

FIG. 6A

RN (ROUND-OFF TO NEAREST EVEN) MODE
"★" : ARBITRARY BIT STATE

| SIGN BIT | $2^1$ BIT | $2^{-51}$ BIT | LSB | GUARD BIT | ROUND BIT | STICKY BIT | ROUND-OFF PROCESSING |
|---|---|---|---|---|---|---|---|
| ★ | 0 | ★ | ★ | 0 | ★ | ★ | TRUNCATE |
| ★ | 0 | ★ | 0 | 1 | 0 | 0 | " |
| ★ | 0 | ★ | 1 | 1 | 0 | 0 | ADD 1 TO $2^{-52}$ BIT (LSB) |
| ★ | 0 | ★ | ★ | 1 | ★ | 1 | " |
| ★ | 0 | ★ | ★ | 1 | 1 | ★ | " |
| ★ | 1 | ★ | 0 | ★ | ★ | ★ | TRUNCATE |
| ★ | 1 | 0 | 1 | 0 | 0 | 0 | " |
| ★ | 1 | 1 | 1 | 0 | 0 | 0 | " |
| ★ | 1 | ★ | 1 | ★ | ★ | 1 | ADD 1 TO $2^{-51}$ BIT (LSB) |
| ★ | 1 | ★ | 1 | ★ | 1 | ★ | " |
| ★ | 1 | ★ | 1 | 1 | ★ | ★ | " |

FIG. 6B

RP (ROUND TOWARD PLUS INFINITY) MODE
"★" : ARBITRARY BIT STATE

| SIGN BIT | $2^1$ BIT | $2^{-51}$ BIT | LSB | GUARD BIT | ROUND BIT | STICKY BIT | ROUND-OFF PROCESSING |
|---|---|---|---|---|---|---|---|
| 1 | ★ | ★ | ★ | ★ | ★ | ★ | TRUNCATE |
| 0 | 0 | ★ | ★ | 0 | 0 | 0 | " |
| 0 | 0 | ★ | ★ | ★ | ★ | 1 | ADD 1 TO $2^{-52}$ BIT (LSB) |
| 0 | 0 | ★ | ★ | ★ | 1 | ★ | " |
| 0 | 0 | ★ | ★ | 1 | ★ | ★ | " |
| 0 | 1 | ★ | 0 | 0 | 0 | 0 | TRUNCATE |
| 0 | 1 | ★ | ★ | ★ | ★ | 1 | ADD 1 TO $2^{-51}$ BIT (LSB) |
| 0 | 1 | ★ | ★ | ★ | 1 | ★ | " |
| 0 | 1 | ★ | ★ | 1 | ★ | ★ | " |
| 0 | 1 | ★ | 1 | ★ | ★ | ★ | " |

FIG. 6C

RM (ROUND TOWARD MINUS INFINITY) MODE
"★" : ARBITRARY BIT STATE

| SIGN BIT | $2^1$ BIT | $2^{-51}$ BIT | LSB | GUARD BIT | ROUND BIT | STICKY BIT | ROUND-OFF PROCESSING |
|---|---|---|---|---|---|---|---|
| 0 | ★ | ★ | ★ | ★ | ★ | ★ | TRUNCATE |
| 1 | 0 | ★ | ★ | 0 | 0 | 0 | " |
| 1 | 0 | ★ | ★ | ★ | ★ | 1 | ADD 1 TO $2^{-52}$ BIT (LSB) |
| 1 | 0 | ★ | ★ | ★ | 1 | ★ | " |
| 1 | 0 | ★ | ★ | 1 | ★ | ★ | " |
| 1 | 1 | ★ | 0 | 0 | 0 | 0 | TRUNCATE |
| 1 | 1 | ★ | ★ | ★ | ★ | 1 | ADD 1 TO $2^{-51}$ BIT (LSB) |
| 1 | 1 | ★ | ★ | ★ | 1 | ★ | " |
| 1 | 1 | ★ | ★ | 1 | ★ | ★ | " |
| 1 | 1 | ★ | 1 | ★ | ★ | ★ | " |

FIG. 6D

RZ (ROUND TOWARD ZERO) MODE
"★" : ARBITRARY BIT STATE

| SIGN BIT | $2^1$ BIT | $2^{-51}$ BIT | LSB | GUARD BIT | ROUND BIT | STICKY BIT | ROUND-OFF PROCESSING |
|---|---|---|---|---|---|---|---|
| ★ | ★ | ★ | ★ | ★ | ★ | ★ | TRUNCATE |

FIG. 8

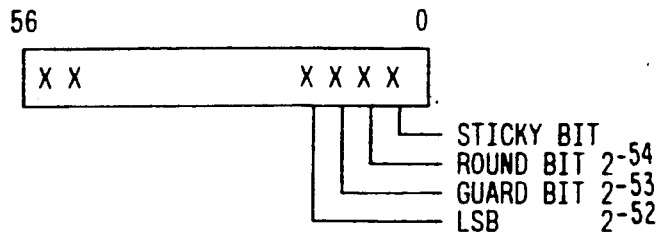

```
       56                    0
      ┌─────────────────────┐
      │ X X         X X X X │
      └─────────────────────┘
                      │ │ │ └── STICKY BIT
                      │ │ └──── ROUND BIT  2⁻⁵⁴
                      │ └────── GUARD BIT  2⁻⁵³
                      └──────── LSB        2⁻⁵²
```

FIG. 9A

RN (ROUND-OFF TO NEAREST EVEN) MODE
"★" : ARBITRARY BIT STATE

| SIGN BIT | $2^{-52}$ LSB | $2^{-53}$ GUARD BIT | $2^{-54}$ ROUND BIT | STICKY BIT | ROUND-OFF PROCESSING |
|---|---|---|---|---|---|
| ★ | ★ | 0 | ★ | ★ | TRUNCATE |
| ★ | 0 | 1 | 0 | 0 | " |
| ★ | 1 | 1 | 0 | 0 | ADD 1 TO $2^{-52}$ BIT (LSB) |
| ★ | ★ | 1 | ★ | 1 | " |
| ★ | ★ | 1 | 1 | ★ | " |

FIG. 9B

RP (ROUND TOWARD PLUS INFINITY) MODE
"★" : ARBITRARY BIT STATE

| SIGN BIT | $2^{-52}$ LSB | $2^{-53}$ GUARD BIT | $2^{-54}$ ROUND BIT | STICKY BIT | ROUND-OFF PROCESSING |
|---|---|---|---|---|---|
| 1 | ★ | ★ | ★ | ★ | TRUNCATE |
| 0 | ★ | 0 | 0 | 0 | " |
| 0 | ★ | ★ | ★ | 1 | ADD 1 TO $2^{-52}$ BIT (LSB) |
| 0 | ★ | ★ | 1 | ★ | " |
| 0 | ★ | 1 | ★ | ★ | " |

FIG. 9C

RM (ROUND TOWARD MINUS INFINITY) MODE
"★" : ARBITRARY BIT STATE

| SIGN BIT | $2^{-52}$ LSB | $2^{-53}$ GUARD BIT | $2^{-54}$ ROUND BIT | STICKY BIT | ROUND-OFF PROCESSING |
|---|---|---|---|---|---|
| 0 | ★ | ★ | ★ | ★ | TRUNCATE |
| 1 | ★ | 0 | 0 | 0 | " |
| 1 | ★ | ★ | ★ | 1 | ADD 1 TO $2^{-52}$ BIT (LSB) |
| 1 | ★ | ★ | 1 | ★ | " |
| 1 | ★ | 1 | ★ | ★ | " |

FIG. 9D

RZ (ROUND TOWARD ZERO) MODE
"★" : ARBITRARY BIT STATE

| SIGN BIT | $2^{-52}$ LSB | $2^{-53}$ GUARD BIT | $2^{-54}$ ROUND BIT | STICKY BIT | ROUND-OFF PROCESSING |
|---|---|---|---|---|---|
| ★ | ★ | ★ | ★ | ★ | TRUNCATE |

FLOATING-POINT ARITHMETIC APPARATUS WITH COMPENSATION FOR MANTISSA TRUNCATION

BACKGROUND OF THE INVENTION

1. Field of the Invention

The present invention relates to an apparatus for floating-point arithmetic processing, and in particular to a floating-point multiplication apparatus or addition and subtraction apparatus in which the state of a specific bit, referred to as a sticky bit, depends upon the logical sum of a set of low-significance bits which are truncated during a mantissa processing operation, and in which that specific bit is used in determining a subsequent mantissa round-off operation that is executed on the result of that mantissa processing operation.

2. Description of the Related Art

In a floating-point multiplication operation, it is necessary to multiply the mantissa of one operand by the mantissa of the other (each mantissa consisting of a standard fixed number of bits). The result of the mantissa multiplication (referred to in the following as the mantissa intermediate product) will contain approximately twice as many bits as that of each mantissa of the original operands. Thus it is necessary to truncate an excess number of low-significance bits. However to achieve maximum accuracy in a round-off operation that is executed to obtain the mantissa of the final product, three bits which are obtained as a result of that mantissa multiplication and are of lower significance than the standard mantissa LSB position are used in that round-off operation. These additional bits are respectively designated as, in descending order of significance following the standard mantissa LSB position, a guard bit, a round bit and a sticky bit, and appear in the mantissa intermediate product after the aforementioned bits have been truncated. The "1" or "0" state of the sticky bit is determined by an OR logic operation applied to all of the aforementioned truncated low-significance bits, that is to say, if any of the truncated bits is a "1" bit then the sticky bit is set to "1" and otherwise to "0". A predetermined round-off operation is then applied to the resultant mantissa intermediate product, with that round-off operation being executed based on a combination of bit states including those of the guard bit, round bit and sticky bit. With one prior art floating-point multiplication apparatus, as described in detail hereinafter, the aforementioned truncated bits of the mantissa intermediate product are successively examined by using a shifting circuit, in order to apply the logical OR operation to these, i.e. to detect the presence of a "1" state bit. However such a successive shifting operation is an obstacle to achieving a high speed of processing.

In the case of a floating-point addition and subtraction apparatus, before adding together two floating-point operands, or subtracting one from the other, it is necessary to execute shifting of the mantissa bits of one of the operands, if the operands have respectively different exponents. In practice, the mantissa bits of the operand having the smaller value of exponent are right-shifted to bring about equality of the exponents (i.e. shifted by a number of bit positions that is equal to the difference between the two exponents), and thus enable addition or subtraction of the result of the right-shifting to or from the other mantissa. As a result of that right-shift operation, some of the low-significance bits of the mantissa of the operand having the lower value of exponent will overflow beyond the mantissa LSB position. In order to achieve maximum accuracy, it is necessary to take into account these overflowed bits in the subsequent arithmetic processing. This is done by attaching to the result of that right-shifting operation, at a lowest significance position (specifically, two bit positions below the standard mantissa LSB position), a bit referred to in the following as a spilled bit, whose state is determined by the logic sum (i.e. OR function) of all of the bits which have overflowed. That is to say, if at least one of these overflow bits is a "1" value, then the spilled bit is set as "1", and otherwise it is set as "0". After the addition or subtraction of the mantissas has been executed and the absolute value of the result obtained, a round-off operation is executed on the result, using the states of bits at positions corresponding to the aforementioned guard bit, round bit and sticky bit to determine the type of round-off operation. The state of the sticky bit is determined by that of the spilled bit and by whether a mantissa addition or subtraction operation was executed.

One prior art method that has been proposed for determining the state of the spilled bit in this case is to successively shift each of the overflow bits through a circuit which detects the presence of any "1" state bit, and to set the contents of a 1-bit register to the "1" state when such detection occurs. However such a method has the disadvantage of time being required for shifting these successive bits in order to determine the state of the spilled bit. If such a successive shifting operation were not necessary, it would be possible to execute a parallel shifting operation on the mantissa of the operand having the lower value of exponent. In addition, the amount of time required to determine the spilled bit is not fixed, but will vary in accordance with the amount of difference between the exponents of the two operands and the position of the lowest-significance "1" state bit in the operand which has the lower value of exponent. Such variations in timing result in complexity of circuit control, making it difficult to implement a practical floating-point addition and subtraction apparatus by such a method. For that reason, a floating-point addition and subtraction apparatus has been proposed, as described in greater detail hereinafter, in which the state of the spilled bit is established based upon the difference between the exponents of the two operands and the position of the lowest-significance "1" state bit in the operand which has the smaller exponent of the two operands. However it is necessary to first determine which of the operands has the lower value of exponent, before detecting that position of the lowest-significance "1" state bit and then determining the state of the spilled bit, so that the greatest possible processing speed cannot be attained.

SUMMARY OF THE INVENTION

It is an objective of the present invention to overcome the disadvantages of the prior art as set out above, by providing a floating-point arithmetic apparatus capable of a higher speed of operation than is possible with such a prior art apparatus.

More specifically, it is a first objective of the present invention to provide a floating-point multiplication apparatus whereby it is made unnecessary to execute successive shifting operations on a specific set of low-significance bits of a mantissa intermediate product in order to determine the state of a specific bit, designated as a sticky bit, which is to be used in round-off processing of that mantissa intermediate product and whose state varies in accordance with the logical sum of the low-significance bits.

It is a second objective of the present invention to provide a floating-point addition and subtraction apparatus whereby it is made unnecessary to execute successive shifting operations on a set of low-significance bits which overflow from the mantissa of one of two operands in a preshift operation, in order to determine the state of a spilled bit and whose state varies in accordance with the logical sum of the low-significance bits, and hence determine the state of a sticky bit that is to be used in round-off processing of a mantissa intermediate operational result which is obtained by mutually adding or subtracting the mantissas of these operands.

To achieve the first objective set out above, the present invention provides, in a floating-point multiplication apparatus for receiving a multiplicand and a multiplier each consisting of an exponent and a mantissa and each expressed in an identical floating-point numeric format, and for producing as a multiplication result expressed in that floating-point numeric format, including means for multiplying the mantissas of the multiplicand and multiplier to obtain a mantissa intermediate product, the mantissa intermediate product containing a round bit at a position of lower significance than a mantissa least significant bit position in the numeric format, and including means for executing round-off of the mantissa intermediate product based on a combination of values including a logical sum of all bits of the intermediate product that are of lower significance than the round bit, the improvement comprising:

first trailing zeros detection means for deriving a total number of "0" state bits extending continuously from the least significant bit position of the mantissa of the multiplicand;

second trailing zeros detection means for deriving a total number of "0" state bits extending continuously from the least significant bit position of the mantissa of the multiplier;

adder means for obtaining the sum of the numbers of "0" state bits derived by the first and second trailing zeros detection means respectively; and comparison means for deriving the logical sum based on a comparison between the sum value produced by the adder means and a total number of the bits of the mantissa intermediate product that are of lower significance than the round bit.

To achieve the second objective set out above, the present invention provides, in a floating-point addition and subtraction apparatus for operating on a first and a second operand each consisting of an exponent and a mantissa and each expressed in an identical floating-point numeric format, and for producing an addition or subtraction operation result expressed in the floating-point numeric format, including means for operating on the mantissas of the first and second operands to obtain an intermediate operation result, the intermediate operation result containing a round bit at a position of lower significance than a mantissa least significant bit position in the numeric format, and means for executing round-off of the intermediate operation result based on a combination of values including a logical sum of all bits of the intermediate operation result which are of lower significance than the round bit, the improvement comprising:

first trailing zeros detection means for deriving a total number of "0" state bits extending continuously from the least significant bit position of the mantissa of the first operand;

second trailing zeros detection means for deriving a total number of "0" state bits extending continuously from the least significant bit position of the mantissa of the second operand;

first comparison means for detecting which of the first and second operands has a smaller value of exponent, and for designating a number of right-shift operands to be applied to the mantissa of the operand having that smaller value of exponent, to equalize the exponents by truncating a specific number of bits from the mantissa;

selector means controlled by the magnitude comparison means for selecting one of the total numbers of "0" state bits produced from the first and second trailing zeros detection means respectively, which is derived from the mantissa of the one of the first and second operands having the smaller value of exponent;

and second comparison means for deriving the logical sum based on a comparison between the total number of "0" state bits produced from the selector means and the number of bits that are truncated by the right-shifting operation.

BRIEF DESCRIPTION OF THE DRAWINGS

FIG. 4 is a diagram showing floating-point data formats in accordance with the ANSI/IEEE Std.754-1985 standards;

FIG. 5 illustrates the arrangement of bits in a mantissa intermediate product which is produced in the embodiment of FIG. 3, after discarding a set of low-significance bits;

FIGS. 6A to 6D show respective round-off processing modes which be executed by the embodiment of FIG. 3;

FIG. 8 shows the bit arrangement of an intermediate operational result that is produced in the embodiment of FIG. 7; and FIGS. 9A to 9D show respective round-off processing modes which can be executed by the embodiment of FIG. 7.

DESCRIPTION OF PREFERRED EMBODIMENTS

Figure 1:
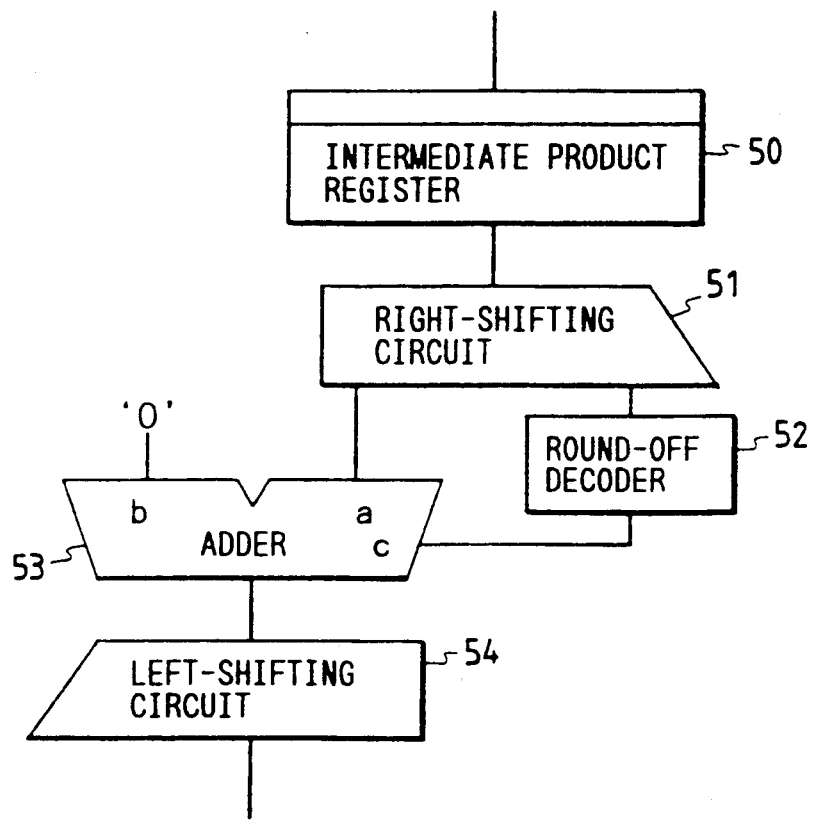
FIG. 1 is a block diagram for describing round-off processing in a prior art floating-point multiplier apparatus.

For a better understanding of the preferred embodiments, generally utilized standards for intermediate results obtained in floating-point arithmetic will be described, as well as details of the aforementioned prior art inventions having similar objectives to the present invention.

Sections (1), (2) and (3) of FIG. 4 respectively show the single-precision, double-precision and extendedprecision standard floating-point number formats in accordance with the ANSI/IEEE Std.754-1985. In the following, use of the double-precision number standard format shown in section (2) of FIG. 4 will be assumed, in which the mantissa is a fraction formed of 53 bits. The 5 bits are designated by successive number from 0 upward, beginning from the LSB of the mantissa. The corresponding standard format of the mantissa intermediate product generated in a floating-point multiplier is shown in FIG. 5, in which the 106 bits of the intermediate product are numbered successively from 0 to 105 (i.e. from positions $2^{-104}$ to $2^1$), with bit 105 (the overflow bit) being the MSB. In FIG. 4, "LSB" denotes the aforementioned standard mantissa LSB position ($2^{-52}$). The bit of next lower significance below the LSB bit 52 is the guard bit 51 ($2^{-53}$), and the next lower bit is the round bit 50 ($2^{-54}$). The sticky bit position is bit 49 ($2^{-55}$), and the state of the sticky bit is determined as the logical sum of all of the bits 0 to 49 of the intermediate product. That is to say, after the intermediate product formed of the bits shown in FIG. 4 has been generated, the bits 0 to 49 are truncated, and the aforementioned sticky bit replaces the truncated bits. A round-off operation is then executed on the bits 52 to 103, using the state of the sticky bit in that operation, to obtain the final mantissa.

Thus, to obtain the mantissa of the product of two floating-point operands, the following steps are necessary (assuming the format of FIG. 4):

(a) Multiply one operand by the other, to obtain an intermediate product consisting of 106 bits;

(b) Discard the low-significance bits 0 to 49 (i.e. $2^{-104}$ to $2^{-55}$);

(c) Determine whether there is any "1" state bit within the truncated bits 0 to 49, and if so set bit 49 (the sticky bit) as "1", otherwise set it as "0";

(d) Execute a round-off operation on the 52 bits in the intermediate product which are of higher significance than the guard bit (i.e. bits 52 to 103 in FIG. 4), with that round-off operation being executed in accordance with the states of various bits including the sticky bit. The result of the round-off operation is the final value of mantissa, unless it is necessary to execute a 1-bit right shift.

FIG. 1 is a block diagram for illustrating the basic essential features of a prior art example of a floating-point multiplication for achieving the above objective, which is described in Japanese Patent Laid-open No. 63-157230. For brevity of description, only the portions concerned with processing the mantissa intermediate product are shown. The mantissa intermediate product is held in a mantissa intermediate product register 50, and overflowing of the low-significance bits 0 to 49 of the intermediate product is executed by a right-shift circuit 51. A round-off decoder circuit 52 functions to detect, as successive ones of these low-significance bits are shifted out of the right-shift circuit 51, whether or not any of the bits is equal to "1". If that condition is detected, then the round-off decoder 52 supplies a "1" bit, as the sticky bit, to the carry input of an adder 53, which executes round-off of the portion of the mantissa intermediate product remaining after the low-significance bits 0 to 51 have been removed. The output produced from the adder 53 is then left-shifted in the left-shift circuit 54 to obtain the mantissa of the final product.

However such an apparatus has the disadvantage that it is necessary to execute the right-shift operation of the circuit 51 successively, bit by bit, through all of the low-significance bits 49 to 0, in order that the circuit 52 can determine whether any of these is a "1" bit. That is an obstacle to achieving a high speed of operation, since the number of bits that must be shifted is approximately one half of the total number of bits in the mantissa intermediate product, e.g. 50 bits in the above example.

Figure 2:
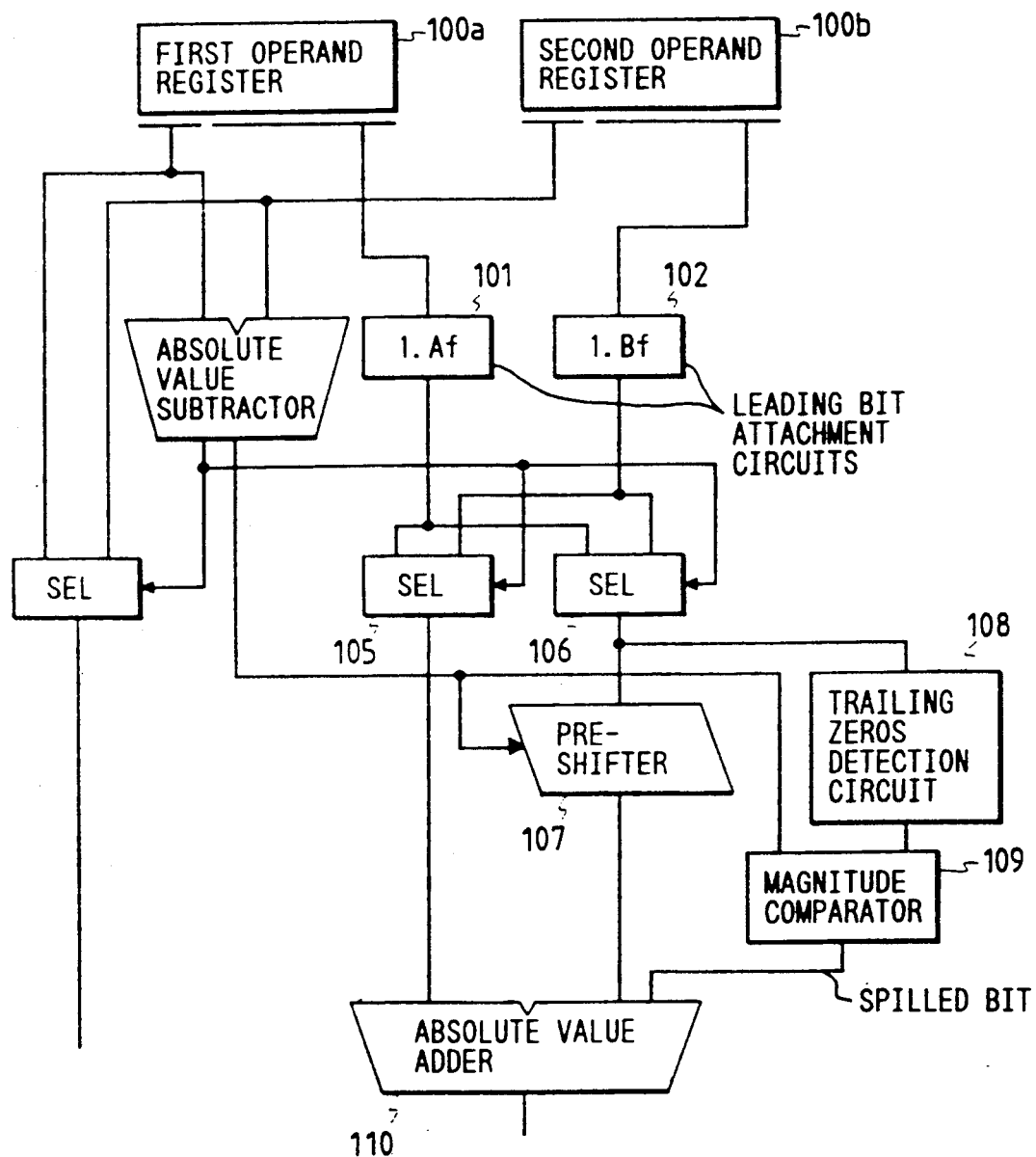
FIG. 2 is a block diagram for describing processing to obtain a spilled bit, upon which subsequent round-off operation depends, in a prior art floating-point addition and subtraction apparatus.

With regard to a floating-point addition and subtraction apparatus, a prior art patent application (Japanese Patent Laid-open No. 62-298435) describes an apparatus whereby the state of the sticky bit, required as mentioned above for a final round-off operation, can be predicted without the necessity for executing such a variable-length shifting operation on the mantissa of the operand having the lower value of exponent. The basic features of that invention are shown in FIG. 2, which is essentially identical to the contents of FIG. 3 of that Japanese patent document but has been slightly amended and expanded to conform with the arrangement and terminology of an embodiment of a floating-point addition and subtraction apparatus according to the present invention described hereinafter, for ease of comparison. In FIG. 2, first and second floating-point operands which are to be mutually added or subtracted are held in registers 100$a$ and 100$b$ respectively. A leading bit is attached to the respective mantissas of these operands, read out from the registers 100$a$, 100$b$, by circuits 101, 102, and the resultant mantissas with leading bits attached are selectively transferred through data selectors 105, 106 to a pre-shifter circuit 107 and an input of an absolute value adder 110. The exponents of the first and second operands are compared in an absolute value subtractor 103, to obtain a first output which expresses the amount of difference between the exponents, and a second output for indicating which of the two operands has the smaller value of exponent. The second output is applied to the selectors 105, 106 such that the mantissa of the operand having the smaller exponent is transferred to the pre-shifter circuit, and the mantissa of the other operand is transferred directly to an input of the adder 110. The first output from the comparator 103 is applied to the pre-shifter circuit 107, for determining a number of right-shift operations that will be applied to the mantissa of the operand having the smaller exponent, with output data from the pre-shifter circuit 107 after that shifting has been completed being supplied to the other input of the adder 110. That output data consists of the higher-significance bits extending upward from the LSB position, which remain after the shifting has been completed, together with the aforementioned guard bit and round bit. The second output from the comparator 103 is also applied to a selector 104, for selecting the higher one of the two exponents of the operand to be outputted as the exponent of the finally obtained sum or difference. The novel feature of the invention lies in the fact that the first output from the comparator 103, expressing the amount of difference between the exponents of the two input operands, is also supplied to one input of a magnitude comparator circuit 109, while a trailing-zeros detection circuit 108 serves to detect the number of "0" state bits continuously extending upward in significance from the LSB of the mantissa of the operand having the smaller value of exponent (selected by the selector 106). Alternatively stated, the trailing-zeros detection circuit 108 derives a value expressing the position of the lowest-significance "1" state bit in the mantissa of the operand having the smaller exponent. That value produced from the trailing-zeros detection circuit 108 is supplied to the other input of the magnitude comparator circuit 109, which functions to judge whether the spilled bit is to be set to the "1" or the "0" state, and outputs a corresponding bit to be attached (as the spilled bit) to the low significance end of the output data from the pre-shifter 107, to form one input data value to the adder 110. Thus in a mantissa addition operation, the adder 110 outputs a data value consisting of the sum of the non-shifted mantissa and the non-overflowed portion of the shifted mantissa, with the guard bit, the round bit and the spilled bit successively attached at the low-significance end of that sum, after the LSB position. Thus in this apparatus, without actually judging successive ones of the aforementioned overflow bits from the mantissa of the operand having the lower value of exponent, the magnitude comparator circuit 109 in effect predicts whether or not there is a "1" state bit within the set of overflow bits which are of lower significance than the round bit position in that mantissa having the lower value of exponent, with that prediction being based on the absolute value of difference between the exponents of the two input operands and the number of trailing zeros in the mantissa of the operand having the lower value of exponent. It thereby becomes unnecessary to execute successive shifting of the discarded low-significance bits of that mantissa in order to establish the value of the spilled bit, whose value affects a subsequent round-off operation (not shown).

However such a method has the disadvantage that the detection of the number of trailing zeros cannot be started until after completing the operation of judging which of the two operands has the smaller value of exponent. It would therefore be desirable to provide an apparatus in which it is not necessary to wait for that judgment to be made before executing the trailing zeros detection operation, to achieve higher speed.

Figure 3:
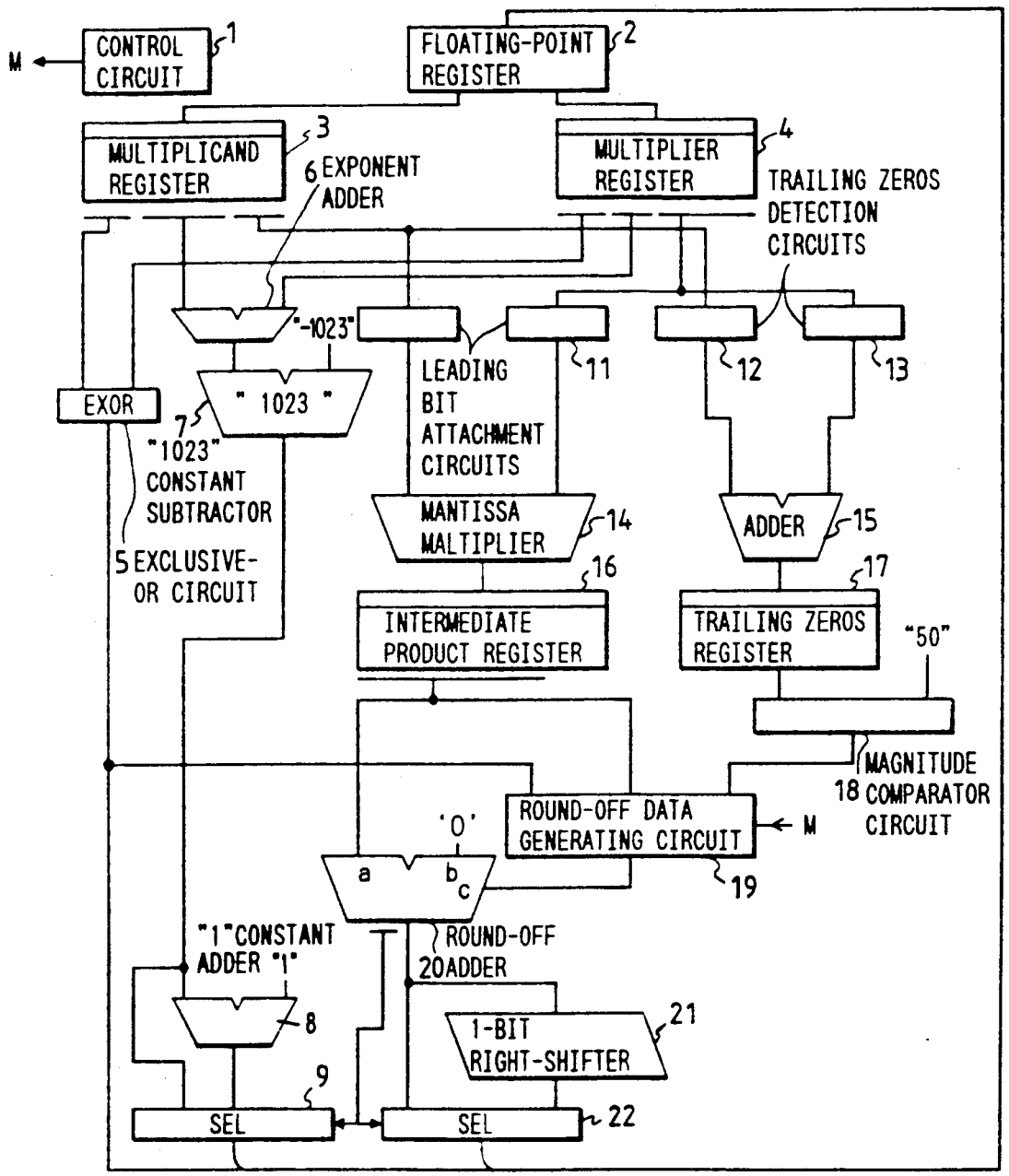
FIG. 3 is a block diagram of a first embodiment of a floating-point multiplier apparatus according to the present invention.

FIG. 3 is a block diagram showing the general configuration of a first embodiment of the present invention, which is a floating-point multiplier apparatus. In FIG. 3, numeral 1 denotes a control circuit for controlling the overall operation of the apparatus, and also for generating round-off mode data M which designate one of a plurality of predetermined types of round-off operation, 2 denotes a floating-point register which can store 32 data words each consisting of a 64 bit floating-point number. The floating-point register 2 is provided with two output ports and a single input port. Numeral 3 denotes a multiplicand register, 4 denotes a multiplier register, 5 denotes an exclusive-OR circuit, 6 denotes an exponent adder, 7 denotes a subtractor for executing only subtraction of a fixed constant value "1023" from the result of summing the exponents of the multiplicand and multiplier, 8 denotes an exponent adder, 9 denotes a data selector for selecting one out of two input values supplied thereto, and 10 and 11 denote respective leading bit attachment circuits. 12 and 13 denote respective trailing zeros detection circuits, for detecting a number of trailing zero bits (i.e. "0" state bits) which continuously extend upwards in significance from and including the LSB (least significant bit) of a word. Numeral 14 denotes a mantissa multiplier, 15 denotes an adder, 16 denotes a mantissa intermediate product register, 17 denotes a trailing zeros register, 18 denotes a magnitude comparison circuit, 19 denotes a round-off data generating circuit, 20 denotes a round-off adder circuit, 21 denotes a circuit for executing 1-bit rs operations, and 22 denotes a data selector for selecting one out of two input values supplied thereto.

This embodiment of the present invention utilizes a double-precision floating-point data format that is in accordance with aforementioned the ANSI/IEEE Std.754-1985, illustrated in section (2) of FIG. 4, in which 63 indicates the position of the MSB, which is the sign bit, and 0 indicates the position of the LSB. The operation of the embodiment is as follows. Firstly, a multiplicand and a multiplier are read out from the floating-point register 2, and are respectively set into the multiplicand register 3 and multiplier register 4. The exclusive-OR circuit 5 receives the sign bits of the multiplicand and multiplier from the multiplicand register 3 and multiplier register 4 respectively, and outputs the exclusive-OR function of these sign bits, as the sign of the product that will be finally obtained. The adder 6 receives as inputs the respective exponents of the multiplier and the multiplicand, outputted from the multiplicand register 3 and multiplier register 4 respectively, produces as output the sum of these exponents. The adder 7 subtracts the constant value "1023" from the output value produced from the adder 6, and outputs the result as the exponent of the intermediate product. This is done since, with the aforementioned standard floating-point number format used with this embodiment, a "biased exponent" is used, whereby the exponent value expressed is equal to the sum of the actual component value and the fixed value 1023, as indicated in FIG. 4.

The mantissas of the multiplicand and multiplier, outputted from the multiplicand register 3 and multiplier register 4 respectively, each have leading "1" state bits attached thereto by the leading bit attachment circuits 10 and 11 respectively. In addition, the respective numbers of "0" state bits extending continuously from the LSB positions of the multiplicand and multiplier are detected by the trailing zeros detection circuits 12 and 13 respectively. The multiplier 14 derives the product of these mantissas (having leading bits attached) produced from the leading bit attachment circuits 10 and 11 respectively, and this product is set into the intermediate product register 16. The adder 15 derives the sum of the respective numbers of trailing zeros in the mantissas of the multiplicand and multiplier (outputted from the trailing zeros detection circuits 12, 13 respectively), and sets that sum value into the trailing zeros register 17.

At this stage, the intermediate product register 16 holds the intermediate product of the mantissas, in the format shown in FIG. 5. In addition, the trailing zeros register 17 holds a predicted value of the number of trailing zeros of the intermediate product of the mantissas. The magnitude comparator 18 compares that number of trailing zeros, produced from the trailing zeros register 17, with a fixed value "50" which is the total number of bits of the intermediate product extending downward in significance after the round bit, i.e. after bit 50 as shown in FIG. 5, to the LSB, i.e. bit 0). If the value "50" is greater than that predicted number of trailing zeros, then the magnitude comparator 18 outputs "1" as being the logic sum of all of the bits of the intermediate product of the mantissas that are of lower significance than the round bit (bit 50), i.e. as the value of the sticky bit. Otherwise, "0" is outputted from the magnitude comparator 18.

The round-off data generating circuit 19 receives the sign of the final product from the exclusive-OR circuit 5, receives the bits 105 (the $2^1$ bit), 53 (the $2^{-51}$ bit), 52

(the $2^{-52}$ bit), 51 (the $2^{-53}$ bit), and 50 (the $2^{-54}$ bit) from the intermediate product register 16, and receives the sticky bit from the magnitude comparator 18, and also receives "round mode" data M supplied from the control circuit 1 which designate the type of round-off that is to be executed. The round-off data generating circuit 19 thereby executes one of the four modes of round-off processing shown in FIGS. 6A, 6B, 6C and 6D, as determined by the "round mode" data M by supplying either a "1" or a "0" bit to the carry input of the round-off adder 20.

The bits 105 to 50 of the mantissa intermediate product are subjected to round-off addition in the round-off adder 20, using the aforementioned carry that is supplied thereto from the round-off data generating circuit 19. The round-off adder 20 also outputs a bit signal B whose value indicates whether or not the $2^1$ bit of the mantissa product that is obtained as a result of that round-off addition processing is equal to "1", and which is applied to control the selection operation of each of the data selectors 9 and 22. If the $2^1$ bit of the mantissa product that is obtained as a result of that round-off addition processing is equal to "1", then the selector 9 selects the output from the adder 8 to be the value of exponent of the finally obtained product, i.e. selects a value which is equal to the exponent of the mantissa intermediate product with "1" added thereto by the adder 8, to be the finally obtained value of exponent. In addition, if that condition (i.e. of the $2^1$ bit of the mantissa product that is obtained as a result of that round-off addition processing being equal to "1") is indicated, the selector 22 selects the output produced from the 1-bit right-shift circuit 21 to be the mantissa of the finally obtained product. Thus in that case, the finally obtained mantissa consists of the 52 bits, extending from the $2^{-1}$ to the $2^{-52}$ (LSB) bit positions shown in FIG. 5, that are obtained by subjecting the result of the round-off operation from the round-off adder 20 to a 1-bit right shift by the 1-bit right-shift circuit 21. If on the other hand the $2^1$ bit of the mantissa product that is obtained as a result of that round-off addition processing is "0", then the selector 9 selects the output from the adder 7, i.e. the exponent of the intermediate product, unchanged, to be the value of exponent of the finally obtained product, and the selector 22 selects the 52 bits (extending from the $2^{-1}$ to the $2^{-52}$ bit positions in FIG. 5) that are produced by the round-off operation of the round-off adder 20, to be the mantissa of the finally obtained product.

Thus with the above embodiment of the present invention, it is not necessary to execute successive shifting in order to execute the logical OR operation (to determine the state of the sticky bit) on the bits of the mantissa intermediate product that are of lower significance than the round bit and are truncated prior to executing the round-off operation by the round-off data generating circuit 19 and round-off adder 20. Instead, the state of the sticky bit is obtained by the magnitude comparator 18, based on the total number of mantissa intermediate product bits that are truncated and the sum of the respective numbers of trailing zeros of the multiplier and multiplicand, so that a high speed of multiplication operation can be achieved.

Figure 7:
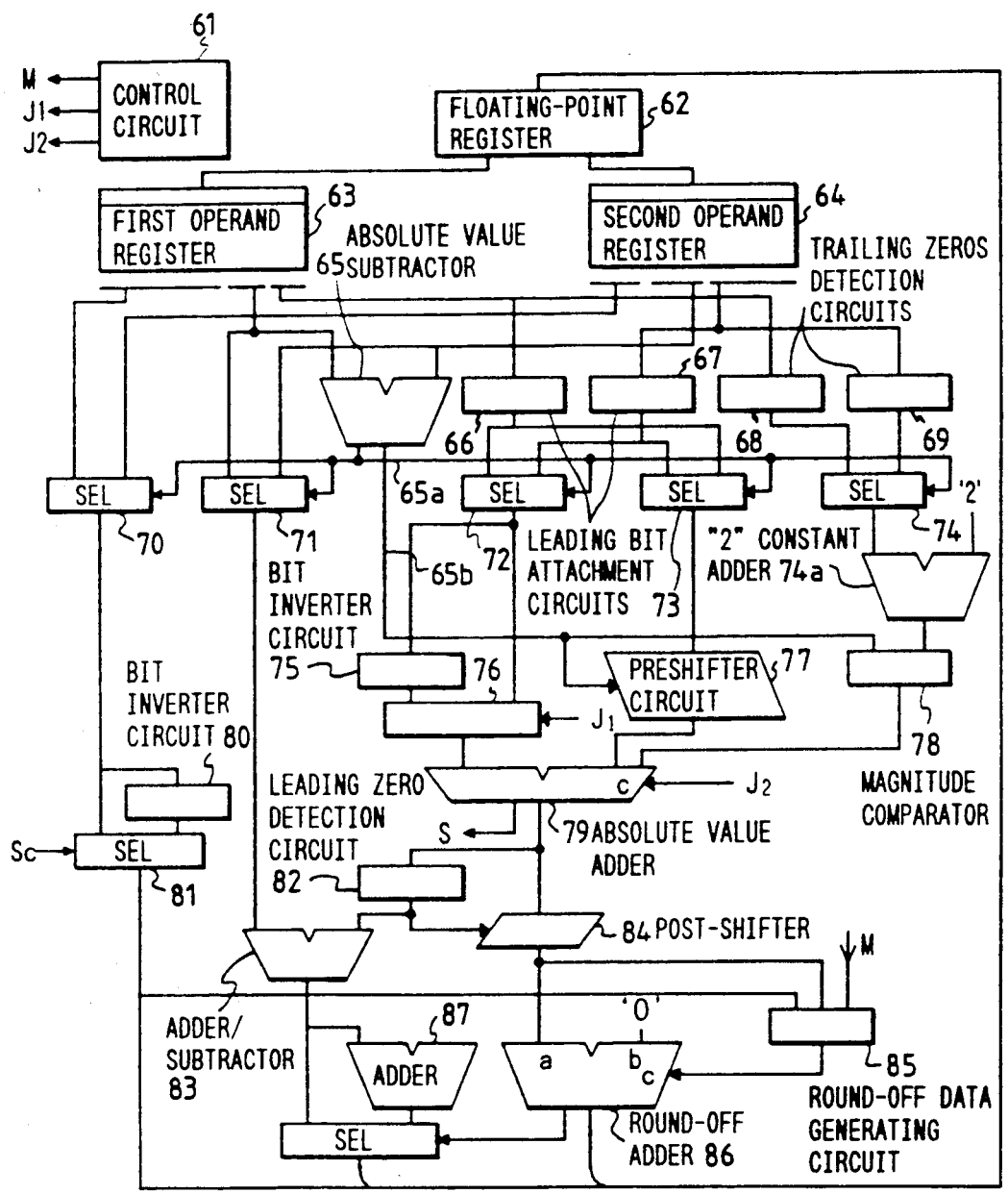
FIG. 7 a block diagram of an embodiment of a floating-point multiplier apparatus according to the present invention.

An embodiment of a floating-point addition and subtraction apparatus according to the present invention will now be described, referring to the general block diagram of FIG. 7. In FIG. 7, 61 denotes a control circuit which controls overall operation of the addition and subtraction apparatus, 62 denotes a floating-point register which can store 32 data words each consisting of a 64 bit floating-point number, and is provided with two output ports and a single input port. Registers 63 and 64 respectively hold a first and a second operand, transferred from the floating-point register 62, which are to be mutually added or subtracted. In the case of a subtraction operation, the operand in the register 63 is the subtrahend. Numeral 65 denotes an absolute value subtractor, 66 and 67 are leading-bit attachment circuits, and 68 and 69 are trailing zeros detection circuits. Each of the circuits 68 and 69 serves to detect a number of "0" state bits which extend continuously upward in significance from the LSB position of the mantissa portion of an operand that is supplied thereto, i.e. with the mantissa portions of the first and second operands being respectively supplied to the trailing zeros detection circuits 68 and 69. 71, 72, 73 and 74 are respective data selectors, each having two input ports and one output port. 75 denotes a bit inverter circuit, 76 denotes a data selector having two input ports and one output port, 77 denotes a pre-shifter circuit for executing right-shifting of the mantissa portion of one of the operands if necessary. 78 denotes a magnitude comparator circuit, 79 denotes an absolute value adder, 80 denotes a bit inverter circuit, and 81 denotes a data selector. 82 denotes a leading zero detection circuit, for detecting any leading "0" state bit in the MSB position of an output result produced from the absolute value adder circuit 79. 83 denotes an adder/subtractor circuit, and 84 denotes a post-shifter circuit for executing a left-shift operation on the output result produced from the absolute value adder circuit 79. 85 denotes a round-off data generating circuit, and 86 denotes a round-off adder which executes a round-off operation on the output data produced from the post-shifter circuit 84 after the aforementioned left shifting has been executed, with that round-off operation being determined in accordance with the contents of the data supplied thereto from the round-off data generating circuit 85. 87 denotes an adder for adding the constant value "1" to the output result produced from the adder 83. 88 denotes a data selector for selecting the output data from the adder 83 or from the adder 87.

As for the first embodiment of the invention described hereinabove, the second embodiment will be assumed to use the double-precision floating-point data format in accordance with the ANSI/IEEE Std.754-1985, which is illustrated in section (2) of FIG. 4. The operation is as follows. The first and second operands are read out from the floating-point register 62 and respectively set into the registers 63 and 64. The control circuit 61 then generates control signals in accordance with whether an input command (not shown in the drawing) supplied thereto designates that the first and second operands are to be mutually added or subtracted and in accordance with the respective signs of the operands (indicated by the respective sign bits of the operands, which are also supplied to the control circuit 61 although not shown in the drawing), since the command contents in combination with the respective signs of the operands determine whether the overall effective operation that will be executed by the apparatus will be an addition or a subtraction. The control circuit 61 accordingly generates a control signal $J_1$ for controlling the operation of selector 76 in accordance with that judgment, and also a 1-bit signal designated as $J_1$, which is set to "0" in the case of an effective mantissa addition operation and to "1" in the case of an effective mantissa subtraction operation. $J_1$ is supplied as an initial carry input to the absolute value adder 79.

The absolute value subtractor circuit 65 receives as inputs thereto the respective exponents of the first and second operands, outputted from the registers 63, 64, and produces on one output line 65a a signal indicating which of the operands has the greater value of exponent (if the exponents are mutually different), and also produces on an output line 65b data representing the absolute value of the difference between the exponents of the two operands.

The mantissas of the first and second operands, outputted from the registers 63, 64 respectively, have "1" state leading bits attached thereto in the leading bit attachment circuits 66 and 70 respectively. In addition, the trailing zeros detection circuits 68, 69 detect the number of trailing "0" state bits in the mantissas of the first and second operands respectively, and output these numbers of trailing zeros. The selectors 70, 71 and 72 are each controlled by the aforementioned output from the absolute value subtractor circuit 65 which indicates the magnitude relationship between the exponents of the first and second operands, such that if the exponent of the first operand is found to be greater than or equal to that of the second operand, the bits representing the sign, exponent, and mantissa (with leading bit attached) of the first operand are respectively selected by these selectors 70, 71 and 72, while otherwise the sign, exponent and mantissa (with leading bit attached) of the second operation are selected by these selectors. The selectors 73 and 74 are each controlled by the aforementioned output from the absolute value subtractor circuit 65 (on line 65a) which indicates the magnitude relationship between the exponents of the first and second operands, such that if the exponent of the first operand is found to be greater than or equal to that of the second operand, the mantissa (with leading bit attached) and the number of trailing zeros detected for the second operand are respectively selected by these selectors while otherwise the mantissa (with leading bit attached) and the number of trailing zeros detected for the first operand are respectively selected by these selectors 73 and 74.

The bit inverter circuit 75 receives as input data the mantissa (with leading bit attached) that has been selected by the selector 72, and inverts each bit thereof. The inverted data are then supplied to one input of the selector 76, while the non-inverted direct output from the selector 72 is supplied to the other input of the selector 76. The selector 76 is controlled by the aforementioned control signal $J_1$ from the control circuit 61, such that if the overall effective operation of the apparatus will be an addition, then the output from the selector 72, with three trailing "0" state bits (i.e. in the $2^{-53}$ to $2^{-55}$ positions attached thereto will be outputted from the selector 76, and such that if the overall effective operation will be a subtraction, then the inverted output data from the bit inverter circuit 75, with three trailing "1" state bits attached thereto will be outputted from the selector 76.

The pre-shifter circuit 77 receives from the selector 73 the mantissa (with leading bit attached) of the operand having the smaller value of exponent, with two additional "0" state bits attached to the low-significance end of that mantissa, i.e. with the total number of bits expanded by two. This ensures that no bits will be lost due to overflow unless the number of right-shifts executed by the pre-shifter circuit 77 is greater than 2. The pre-shifter circuit 77 executes right-shifting of that expanded mantissa by a number of bit positions that is equal to the absolute value of the difference between the exponents of the first and second operands. The aforementioned data value produced on line 65b from the absolute value subtractor circuit 65, representing the magnitude of the difference between the exponents of the operands is supplied as a control input to the pre-shifter circuit 77, to determine the amount of right shifting.

The number of trailing zeros of the operand having the smaller value of exponent is outputted from the selector 74 and has the constant value "2" added thereto in the adder 74a. This is done in order to compensate for the fact that as described hereinabove, two additional trailing zero bits are attached to the mantissa data that are supplied to the pre-shifter circuit 77 from the selector 73. The result is supplied to one input of the magnitude comparator circuit 78, and the value outputted on line 65b from the absolute value subtractor circuit 65 (representing the number of bits by which pre-shifting is to be executed) is supplied to the other input of the magnitude comparator circuit 78. If the value supplied from the absolute value subtractor circuit 65 is the greater of the two inputs to the magnitude comparator circuit 78, then the magnitude comparator circuit 78 outputs a "1" state bit, and otherwise outputs a "0" state bit, as the spilled bit. That is to say, the state of the spilled bit is identical to the logical sum (i.e. OR function) of all of the bits which have overflowed in the right-shift operation executed by the pre-shifter circuit 77.

The absolute value adder circuit 79 receives the selected data that are outputted from the selector 76, as a first input, and receives as a second input a combination of the output data from the pre-shifter circuit 77 with the one-bit output from the magnitude comparator circuit 78 attached at the low-significance end of that data from the pre-shifter circuit 77, as the spilled bit (i.e. at the $2^{-55}$ position). In addition, the 1-bit signal $J_2$ is applied as an initial carry input to the adder 79, from the control circuit 61, and is set to the 0 state in the case of the output from selector 72 being directly selected by the selector 76 (i.e. when the mantissas are to be directly added), and is set as "1" when the output from the bit inverter circuit 75 is selected by the selector 76 (to thereby implement two's complement addition by the adder 79).

The absolute value adder circuit 79 adds together these two input data values, with the initial carry input, and outputs the absolute value of the sum that is obtained to the post-shifter circuit 84. The adder 79 also derives the sign of that sum, prior to obtaining the absolute value, and outputs a bit representing the sign (designated as S in FIG. 7).

A logic circuit (not shown in the drawing) produces a control signal $S_c$ for the selector 81 in accordance with the combination of states of the aforementioned judgment signal $J_2$ from the control circuit 61 which indicates whether the effective overall operation is and addition or subtraction, and the signal S indicating the sign of the result of the addition executed in the absolute value adder circuit 79. The selector 81 is thereby controlled such that, if the control circuit 61 judges that the effective overall operation by the apparatus is a subtraction, and if the signal S indicates a positive sign for the addition result obtained by the absolute value adder circuit 79, then the selector 81 selects the output data from the bit inverter circuit 80. Otherwise, the selector 81 is controlled to select the direct output data from the selector 70.

The leading zeros detection circuit 82 controls the operation of the post-shifter circuit 84 such as to shift the output data from the absolute value adder circuit 79 in a direction and by a number of bit positions such that the bit at the $2^1$ position in the data resulting from that shifting, and the bit at the $2^0$ position, will have the values "0" and "1" respectively. If a right shift must be executed to achieve that result, then there can only be a shift by one bit. If a left shift has to be executed to achieve that result, then the number of bit positions for which the shifting is performed will be in the range from 1 to 54. However the sticky bit is not shifted. If the leading zeros detection circuit 82 designates a right shift by the post-shifter circuit 84, then the number of shift positions is added to the exponent value that has been selected by the selector 71, in the adder 83. If a left shift is executed by the post-shifter circuit 84, then the number of shift positions, supplied to the adder 83 from the leading zeros detection circuit 82, is subtracted from the exponent value selected by the selector 71. If no shifting is executed by the post-shifter circuit 84, then "0" is added in the adder 83 to the exponent value selected by the selector 71.

The post-shifter circuit 84 executes shifting in accordance with the direction and number of bit positions designated by the output from the leading zeros detection circuit 82. If a right shift by one bit position is executed by the post-shifter circuit 84, then the logic sum of the $2^{-54}$ bit (bit 1) and bit 0 (the sticky bit) is derived in the post-shifter circuit 84, and set as the value of bit 0. If a left shift is executed by the post-shifter circuit 84, no change is made in the value of bit 0, while all other bit positions which become empty as a result of the left shifting are set to "0".

The format of the output data from the post-shifter circuit 84 is as shown in FIG. 8.

The round-off data generating circuit 85 receives as inputs the sign bit that is selected by the selector 81, and the LSB (i.e. the bit at the $2^{-52}$ position), the guard bit (i.e. the $2^{-53}$ bit), the round bit (the $2^{-54}$ bit), and the sticky bit (bit 0) which are respectively produced as part of the output data from the post-shifter circuit 84 and shown in FIG. 8, and also receives the round-off mode data M that are outputted from the control circuit 61 to determine the type of round-off that will be executed. The round-off data generating circuit 85 accordingly generates data which specify the type of round-off to be executed based on the states of various bits and the selected round-off mode, and supplies the data to the round-off adder 86, which thereby executes one of the types of round-off operation shown in FIGS. 9A, 9B, 9C and 9D.

The adder 87 adds the fixed value "1" to the exponent value that is outputted from the adder 83, and supplies the result to one input of the selector 88, while the direct output from the adder 83 is supplied to the other input of the selector 88. The selection operation of the selector 88 is controlled by an output signal from the round-off adder 86 which indicates whether or not a carry into the $2^1$ bit position (bit 56) has occurred in the addition executed by the round-off adder 86, i.e. as a result of the round-off operation. If such a carry has occurred, then the output from the adder 87 is selected by the selector 88, and if not, the direct output from the adder 83 is selected to be outputted as the exponent of the floating-point number that is the final result.

The portion of the data result obtained by the addition operation in the round-off adder 86 extending from the $2^{-1}$ (bit 54) to the $2^{-52}$ (bit 3) positions, i.e. a total of 52 bits, is outputted from the round-off adder 86 as the mantissa of the floating-point number that is the final result.

It should be noted that even if a carry to the $2^1$ (bit 56) position has occurred in the addition executed by the round-off adder 86, a correct result will be obtained, although it would seem to be necessary to select the bits 55 ($2^0$) to 4 ($2^{-51}$) to be the final value of mantissa in such a case. However such a carry to the bit 56 position occurs due to all of the 53 bits from bit 55 ($2^0$) to bit 3 ($2^{-52}$) being in the "1" state, so that when a "1" state bit is added to bit 3 to execute round-off, all of the bits 3 to 55 (i.e. from the bit positions $2^{-52}$ to $2^0$) go to the "0" state. Thus there is no obstacle to selecting the 52 bits from bit 54 to bit 3 as the final mantissa value.

The finally obtained processing results are then written into the floating-point register 62, thereby completing the floating-point addition or subtraction operation.

It can be understood that with the above embodiment of the present invention, the "trailing zeros" detection processing is executed (by circuits 67, 68) concurrently with the processing for detecting which of the inputted first and second operands has the smaller value of exponent (by circuit 65). With the prior art addition and subtraction apparatus described hereinabove referring to FIG. 2, however, the trailing zeros detection processing cannot begin until after completing the processing for determining which of the operands has the smaller value of exponent. Thus the present invention enables a higher speed of operation to be achieved than would be possible with that prior art apparatus.

The above embodiments have been described for the case of the ANSI/IEEE Std.754-1985 standard format double-precision floating-point numbers. However the present invention is equally applicable to other floating-point number formats, using the basic principles described above whereby in the case of a floating-point multiplier apparatus, the logic sum is predicted of all of the bits that are truncated from a mantissa intermediate product, to thereby obtain the state of the sticky bit for use in round-off processing, and whereby in the case of a floating-point addition and subtraction apparatus, the logic sum is predicted of all bits which are of lower significance than the round bit in the mantissa of the operand having the smaller value of exponent, to thereby obtain the value of a spilled bit, upon which subsequent round-off processing depends.

What is claimed is:

1. In a floating-point addition and subtraction apparatus for operating on a first and a second operand each consisting of an exponent and a mantissa and each expressed in an identical floating-point numeric format, and for producing an addition or subtraction operation result expressed in said floating-point numeric format, including means (79, 82, 84) for operating on said mantissas of the first and second operands to obtain an intermediate operation result, said intermediate operation result containing a round bit at a position of lower significance than a mantissa least significant bit position in said numeric format, and means (85, 86) for executing round-off of said intermediate operation result based on a combination of values including a logical sum of all bits of said intermediate operation result which are of lower significance than said round bit, the improvement comprising:

first trailing zeros detection means (68) for deriving a total number of "0" state bits extending continuously from said least significant bit position of the mantissa of said first operand;

second trailing zeros detection means (69) for deriving a total number of "0" state bits extending continuously from said least significant bit position of the mantissa of said second operand;

first comparison means (65) for detecting which of said first and second operands has a smaller value of exponent, and for designating a number of right-shift operands to be applied to the mantissa of the operand having that smaller value of exponent, to equalize the exponents by truncating a specific number of bits from said mantissa;

selector means (74) controlled by said magnitude comparison means for selecting one of said total numbers of "0" state bits produced from said first and second trailing zeros detection means respectively, which is derived from the mantissa of the one of said first and second operands having the smaller value of exponent; and second comparison means (78) for deriving said logical sum based on a comparison between said total number of "0" state bits produced from said selector means and said number of bits that are truncated by said right-shifting operation.

* * * * *